(12) United States Patent
Gutierrez et al.

(10) Patent No.: US 9,146,445 B2
(45) Date of Patent: Sep. 29, 2015

(54) INTEGRATED LENS BARREL

(75) Inventors: Roman C. Gutierrez, Arcadia, CA (US); Robert J. Calvet, Pasadena, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 6 days.

(21) Appl. No.: 13/216,225

(22) Filed: Aug. 23, 2011

(65) Prior Publication Data

US 2011/0304914 A1 Dec. 15, 2011
US 2014/0362441 A9 Dec. 11, 2014

Related U.S. Application Data

(63) Continuation of application No. 12/463,234, filed on May 8, 2009, now Pat. No. 8,004,780, which is a continuation of application No. PCT/US2007/084301, filed on Nov. 9, 2007.

(51) Int. Cl.
| | | |
|---|---|---|
| *G02B 7/02* | (2006.01) | |
| *G02B 15/14* | (2006.01) | |
| *G03B 3/10* | (2006.01) | |
| *G02B 7/10* | (2006.01) | |
| *G02B 13/00* | (2006.01) | |

(52) U.S. Cl.
CPC *G03B 3/10* (2013.01); *G02B 7/102* (2013.01); *G02B 13/009* (2013.01); *G03B 2205/0007* (2013.01); *G03B 2205/0084* (2013.01)

(58) Field of Classification Search
USPC ......... 359/811, 813, 815, 819–826, 694, 691, 359/698
See application file for complete search history.

(56) References Cited

U.S. PATENT DOCUMENTS

| 5,717,528 | A * | 2/1998 | Ihara et al. .................... 359/694 |
|---|---|---|---|
| 7,671,510 | B2 | 3/2010 | Kawamura et al. |
| 7,693,408 | B1 * | 4/2010 | Tsai ................................. 396/79 |
| 7,785,023 | B1 * | 8/2010 | Xu .................................. 396/439 |
| 8,208,208 | B2 | 6/2012 | Schwab |
| 2005/0020126 | A1 * | 1/2005 | Shinohara et al. ............ 439/515 |
| 2006/0103953 | A1 * | 5/2006 | Lee et al. ....................... 359/819 |
| 2006/0127074 | A1 * | 6/2006 | Noji ................................. 396/55 |
| 2010/0033835 | A1 * | 2/2010 | Heim et al. ................... 359/683 |

* cited by examiner

*Primary Examiner* — Stephone B Allen
*Assistant Examiner* — Brandi Thomas
(74) *Attorney, Agent, or Firm* — Haynes and Boone, LLP

(57) ABSTRACT

An integrated lens barrel for a miniature camera is disclosed. The lens barrel can include components such as a shutter, an autofocus mechanism, a zoom mechanism, and/or an image stabilization mechanism. These and/or components can define a portion of the lens barrel that increases the length of the lens barrel. An electrostatic MEMS actuator can be used to effect movement of the autofocus mechanism, zoom mechanism, and/or image stabilization mechanism. Integrating the shutter, autofocus mechanism, zoom mechanism, and/or image stabilization mechanism into the lens barrel facilitates the construction of a substantially smaller camera that is suitable for use in personal electronic devices, such as cellular telephones.

20 Claims, 14 Drawing Sheets

INTEGRATED LENS BARREL

RELATED APPLICATIONS

This patent application is a continuation of U.S. application Ser. No. 12/463,234, filed May 8, 2009, which issued on Aug. 23, 2008 as U.S. Pat. No. 8,004,780. U.S. application Ser. No. 12/463,234 in turn is a continuation of International Application No. PCT/US2007/084301, filed on Nov. 9, 2007.

TECHNICAL FIELD

The present invention relates generally to cameras. The present invention relates more particularly to systems and methods for integrating features such as autofocus, zoom, image stabilization, and shuttering into a lens barrel that is suitable for use in a miniature camera.

BACKGROUND

Miniature cameras are currently available in many personal electronic devices, such as cellular telephones, laptop computers, personal digital assistants (PDAs), and the like. Miniature cameras are also available as stand-alone devices for applications such as security and surveillance.

The market for miniature cameras is rapidly expanding. For example, camera-equipped cellular telephones were unheard of just a few years ago, but now they are a significant portion of the cellular telephone market.

However, contemporary miniature cameras may not be well-suited for some applications. For example, contemporary miniature cameras tend to be fixed focus cameras, i.e., the focus of the camera is pre-set and cannot be changed by the user. By using a relatively small aperture, the depth of field is sufficient to provide acceptable focus over a wide range of distances. However, the provided focus may be unacceptable for some applications. Additionally, the small aperture limits the amount of light used to form the image. This limitation may severely limit the camera's use in low light conditions.

It is generally desirable to make miniature cameras as small a possible. This generally restricts the number of desirable features, such as autofocus, that can be provided for a miniature camera. It is desirable to package the components of a miniature camera in a manner that facilitates the incorporation of desirable features, such as autofocus, while facilitating an overall reduction in size of the miniature camera.

BRIEF SUMMARY

An integrated lens barrel for a miniature camera is disclosed. According to an example of an embodiment of the present invention, the integrated lens barrel can comprise a shutter, an autofocus mechanism, a zoom mechanism, and/or an image stabilization mechanism. One or more electrostatic MEMS actuators can be used to actuate the shutter, autofocus mechanism, zoom mechanism, and/or image stabilization mechanism.

According to an example of an embodiment of the present invention, a method for adjusting the focus of a miniature camera can comprise stretching a lens barrel of the miniature camera so as to change a position of a lens thereof. A lens barrel for a miniature camera can comprise a barrel having a stretchable portion, a ramp formed upon the barrel, a ring generally encircling the stretchable portion, and a ramp formed upon the ring. Rotating the ring causes the ramp formed upon the ring to cooperate with the ramp formed upon the barrel so as to effect deformation, e.g., stretching, of the barrel such that a lens disposed within the barrel is moved.

According to an example of an embodiment of the present invention, a method for making an electrostatic MEMS actuator comprises forming at least one channel in a silicon substrate, forming an oxide layer upon the silicon substrate, forming a polysilicon layer upon the oxide layer, and releasing the polysilicon layer from the silicon substrate by dissolving at least a portion of the oxide layer.

A lens barrel can comprise one or more sleeve or sleeve-like structures and can also comprise one or more components that effectively increase the length of the lens barrel. The components can comprise optical elements and other components. The components can comprise lenses, irises, shutters, and actuators, in any desired combination. Indeed, the lens barrel can comprise a sleeve and no components or can comprise components and no sleeve.

For example, a lens barrel can comprise a sleeve portion and a component portion attached to the sleeve portion so as to define a lens barrel that is longer than the sleeve portion alone. In this manner, components including optical elements and/or components other than optical elements, can be used to define the lens barrel or a portion thereof.

According to an example of an embodiment, a method for making an integrated lens barrel can comprise forming a first stack of components, forming a second stack of components, inserting the first stack of components into a sleeve portion of a lens barrel, and attaching the second stack of components to the sleeve portion (such as via either the sleeve portion or via the first stack of optical components). The first stack of components and/or the second stack of components can comprise one or more optical elements. The second stack of components can be attached to the sleeve portion so as to define a lens barrel having a greater length than the sleeve portion alone. Thus, the length of the lens barrel can be increased by using components that are configured so as to function as at least a portion of a lens barrel.

According to an example of an embodiment, a method for making an integrated lens barrel can comprise forming a stack of components. The stack of components can comprise one or more optical elements. The stack of components is inserted into a sleeve portion of a lens barrel such that some of the components are not contained within the sleeve portion. At least some of the components that are not contained within the sleeve portion cooperate with the sleeve portion to define a lens barrel that is longer than the sleeve portion. In this manner, the length of the lens barrel can be defined by using components that are configured so as to function as at least a portion of a lens barrel.

An exemplary lens system is defined that is compatible with the use of such components as a portion of the lens barrel.

Benefits of embodiments of the present invention include the ability to construct smaller miniature cameras with desirable features such as autofocus, zoom, and/or image stabilization, wherein the miniature cameras are suitable for use in smaller personal electronic devices, such as cellular telephones. The size of the camera can be reduced by configuring components of the camera other than the sleeve portion to function as at least a portion of the lens barrel. The use of an integrated lens barrel can reduce the cost of the miniature camera, and consequently of the personal electronic device.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system are disclosed for integrating features such as autofocus, zoom, image stabilization, and shuttering into a lens barrel that is suitable for use in a miniature camera. A lens barrel can be defined as the mechanical components that position the optical elements within an optical train and can include the optical elements themselves. According to an example of an embodiment of the present invention, a MEMS electrostatic actuator forms a part of the lens barrel to facilitate focusing by moving a single lens, which is part of the optical train.

A lens barrel can comprise a sleeve or sleeve-like structure that contains components such as optical elements and actuators, as shown in the example of an embodiment of FIGS. 1-4. In this instance, all of the components can be disposed within the lens barrel sleeve.

Figure 13:
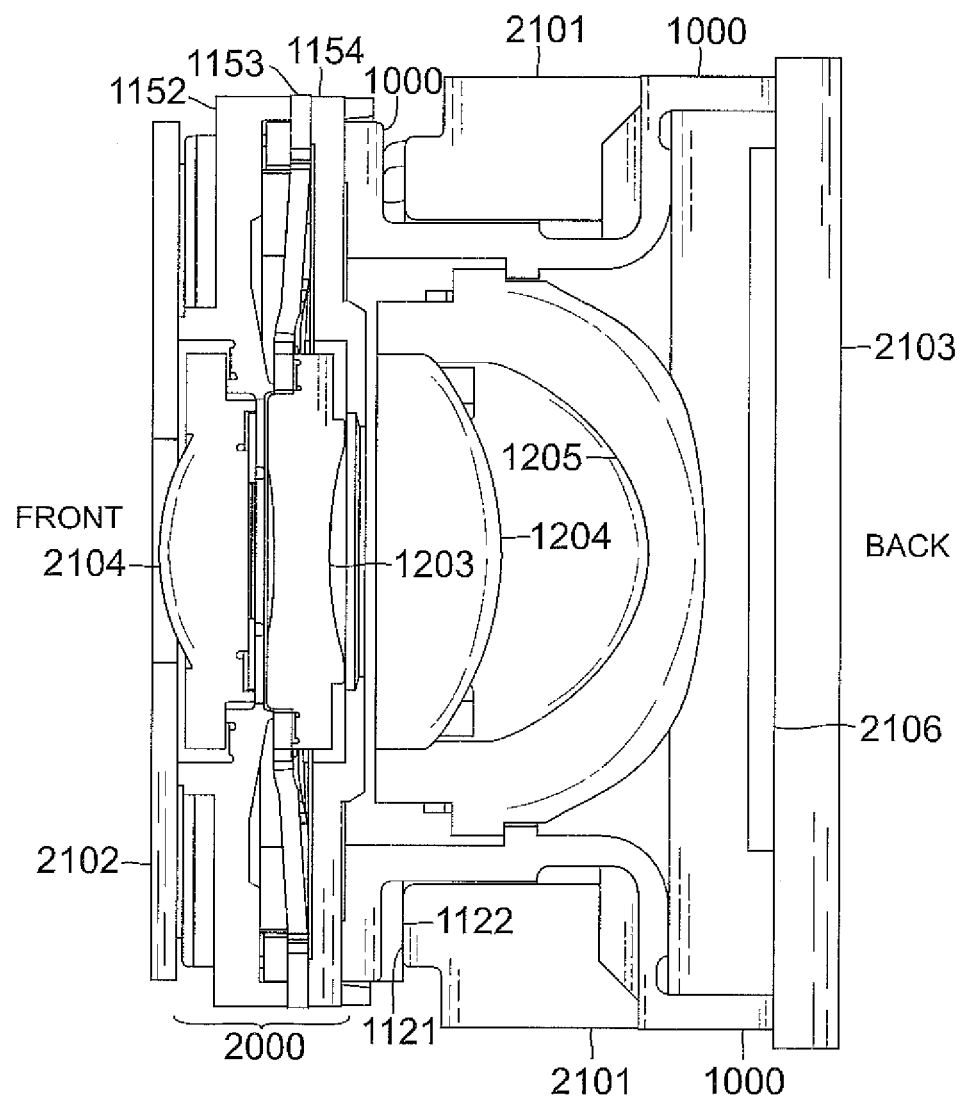
FIG. 13 is an enlarged cross-sectional side view of a lens barrel assembly, according to an example of an embodiment of the present invention.
Figure 14:
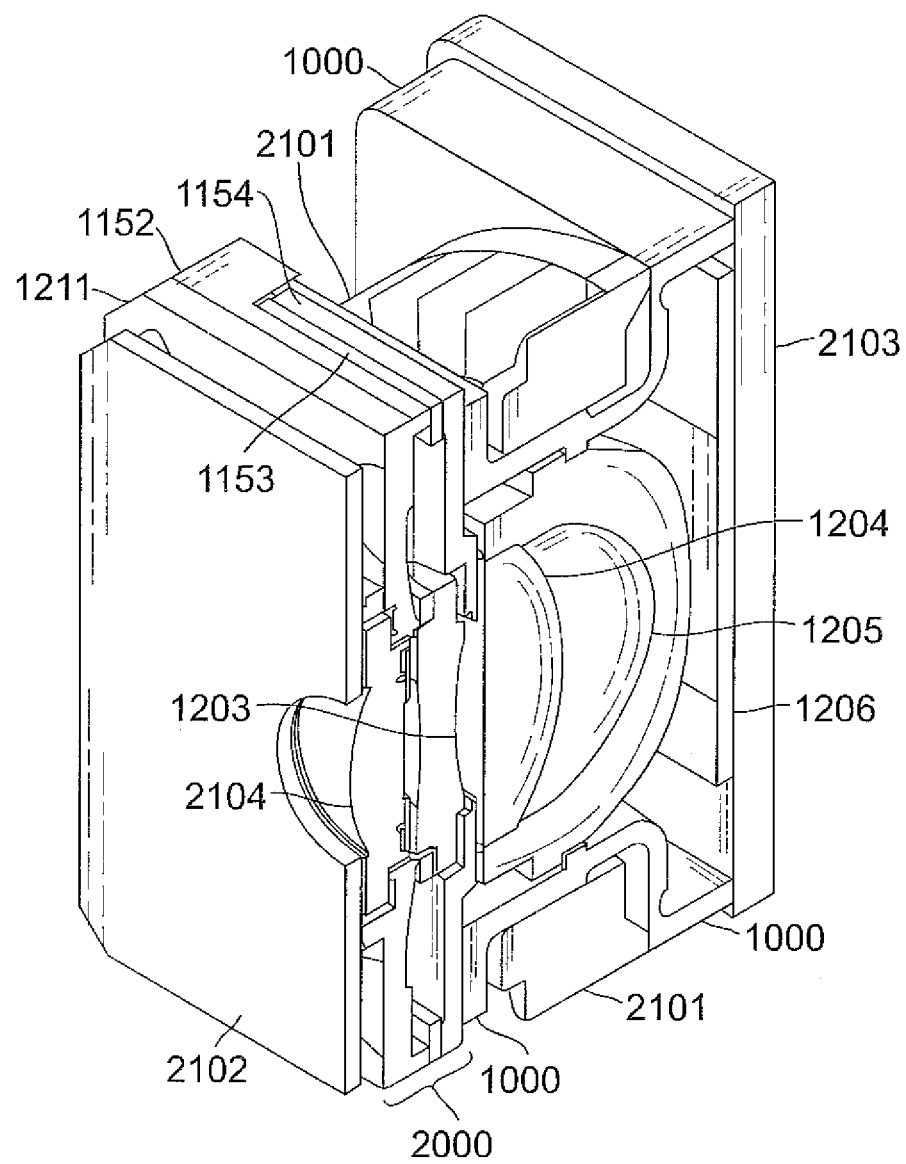
FIG. 14 is a cross-sectional perspective view of the lens barrel assembly of FIG. 13.
Figure 15:
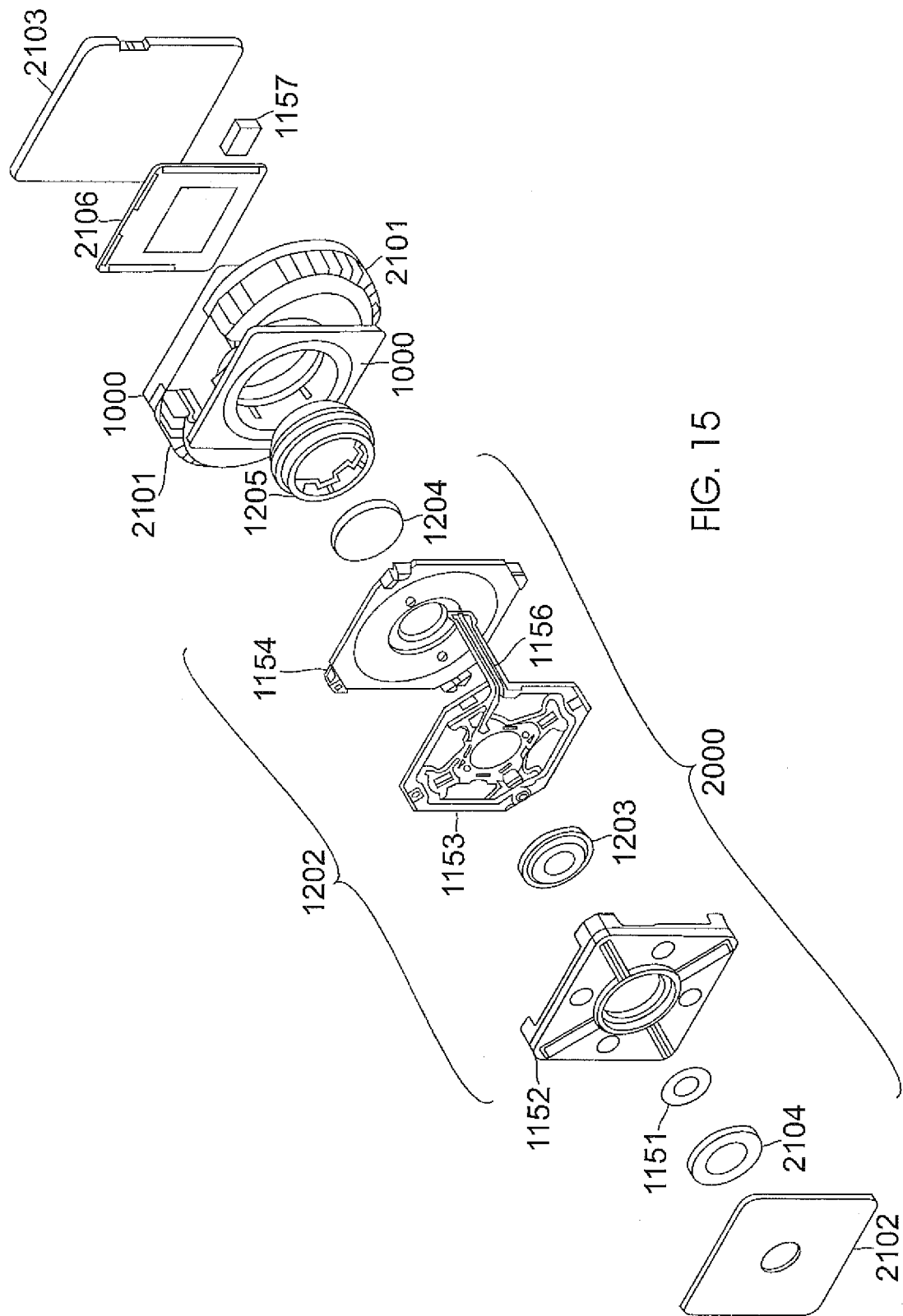
FIG. 15 is an exploded perspective view of the lens barrel assembly of FIG. 13.

Alternatively, a lens barrel can comprise one or more components, such as optical elements and actuators, wherein some of the components are not disposed within the lens barrel sleeve, as shown in the example of an embodiment of FIGS. 13-15. In this instance, at least some of the component(s) can function as a lens barrel or a portion of a lens barrel. A lens barrel can comprise any desired combination of sleeve(s) and component(s).

Figure 2:
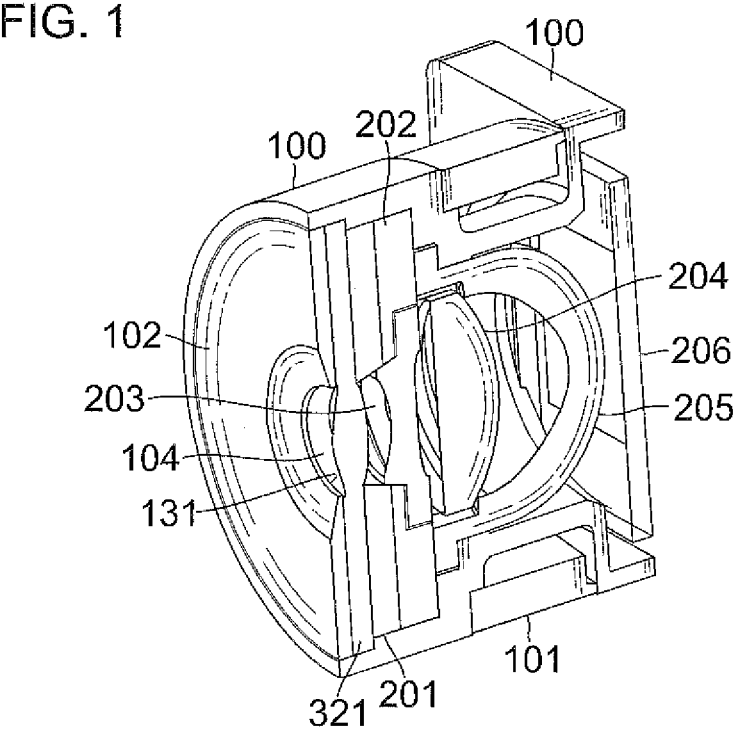
FIG. 2 is a cross-sectional perspective view of the lens barrel assembly of FIG. 1.
Figure 3:
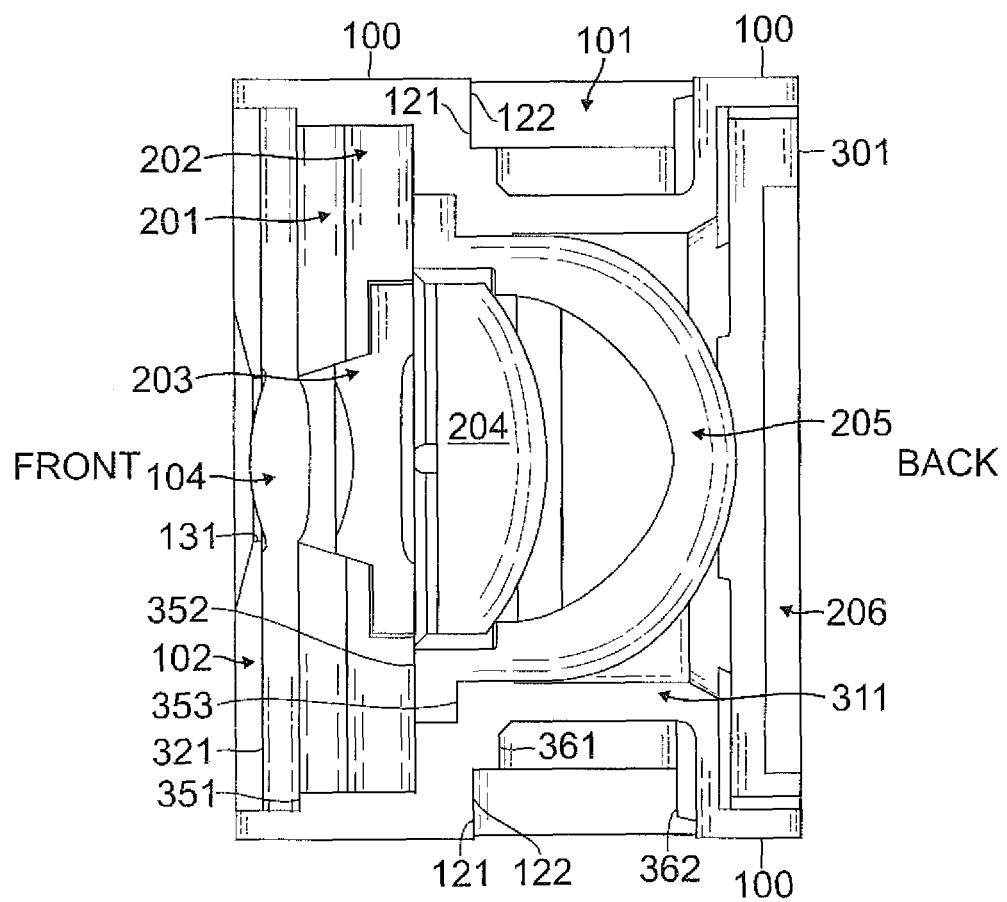
FIG. 3 is an enlarged cross-sectional side view of the lens barrel assembly of FIG. 1.
Figure 4:
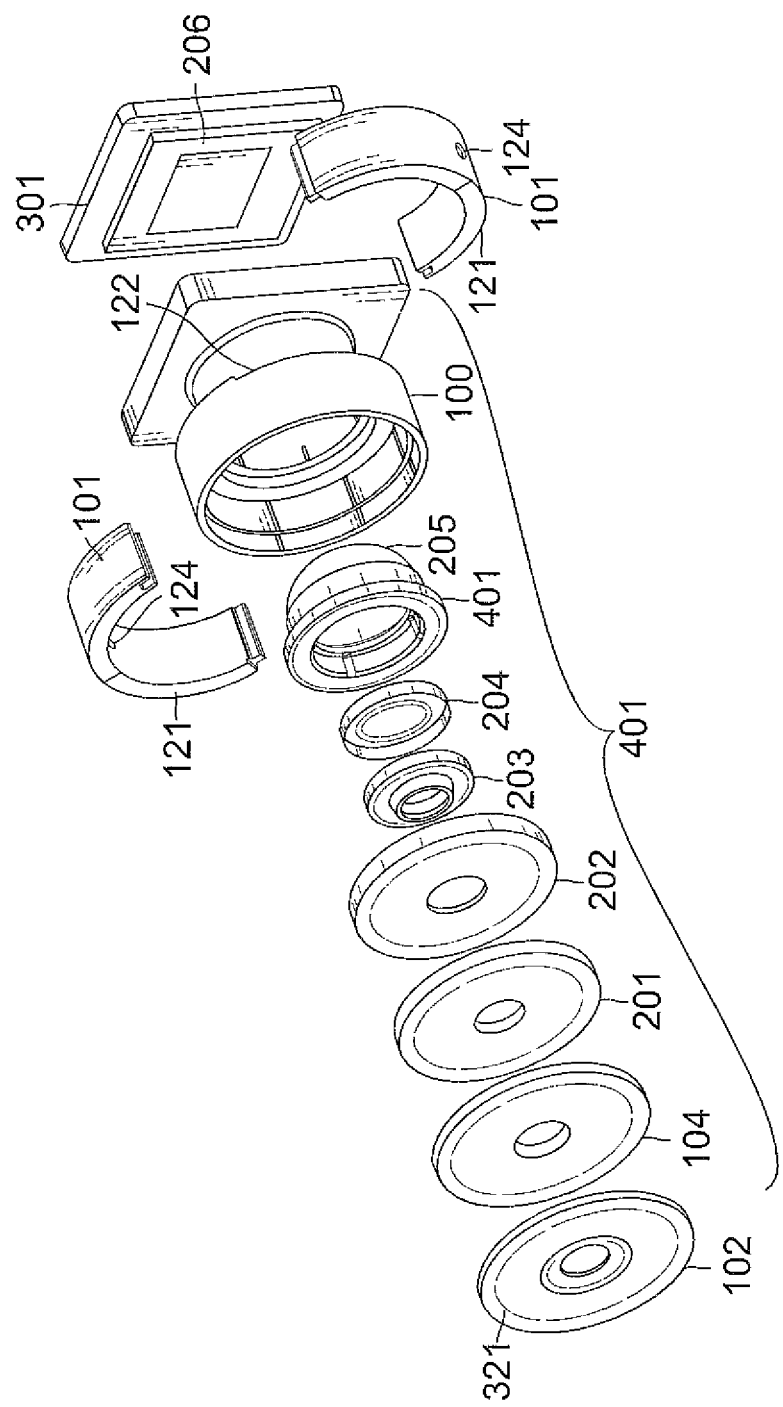
FIG. 4 is an exploded perspective view of the lens barrel assembly of FIG. 1.

The hardware required for shuttering, autofocusing, zooming, image stabilization, etc. can be added to the lens stack and installed in the lens barrel in a fashion similar to the way that a lens is added to the stack. Generally, such hardware will comprise an actuator and/or other moving components. The actuator may be comprised of motion control flexures and force inducing elements. Such hardware (the focus actuator 202 of FIGS. 2-4 is an example of such hardware) can be configured to have a size and shape that is similar to the size and shape of lens in the stack. For example, such hardware can be generally planar and generally round (much like a lens), so as to define a generally flat cylinder that can be placed into a lens stack before the lens stack is placed into the lens barrel.

Alternatively, such hardware can be configured to have a shape and size that is different from a lens. Such hardware can be made out of silicon or any other desired material, can be manufactured using MEMS or any other desired processing techniques, and can contain an optical element (such as a lens) either attached to or not attached to the silicon component.

Because the hardware can be configured, at least somewhat, like a lens, the hardware can be treated much like a lens in the assembly of the lens stack and the lens barrel assembly. Each item of hardware can generally be handled, stacked, and assembled as if it is a lens. In this fashion, the lens barrel can be comprised of separate components that are assembled in a stack to form an integrated lens barrel.

As used herein, a miniature camera can be defined as a camera that is suitable for use in personal electronic devices such as cellular telephones. Thus, miniature cameras are generally substantially smaller than other cameras. There is generally a desire to make miniature cameras as small as possible.

Referring now to FIGS. 1-4, the lens barrel assembly comprises a barrel sleeve 100 that generally encloses optics of the lens barrel assembly. A focus ring 101 can facilitate an initial resolution adjustment of the optics of the lens barrel assembly that can be performed at the factory, as discussed in detail below. This adjustment compensates for variations in the lenses due to manufacturing tolerances.

The barrel sleeve 100 can function as a housing to facilitate handling of the components contained therein, to seal out moisture and other contaminants, and to prevent stray light from reaching the imager. As discussed below, the barrel sleeve 100 facilitates alignment of the optical components. The barrel sleeve 100, if at least partially formed of a conductive material, can also provide electromagnetic interference shielding. For example, the barrel sleeve 100 can be formed of a metal, a polymer with metal fill, or a polymer that is coated with a metal. Optionally, an electromagnetic interference shielding housing, such as a housing formed of metal, can generally surround the integrated lens barrel.

The barrel sleeve 100 can have a tubular portion 110 that defines a substantial portion of the length thereof and is configured to house a plurality of lenses. The barrel sleeve 100 can have a rectangular portion 111 that is configured to house around an imager, such a CMOS imager 206. A front 102 cover can have an opening 131 formed therein to admit light. A back cover can be defined by an imager printed circuit board (PCB) 103 can seal the imager 206 within the rectangular portion 110 of the barrel sleeve 100.

A first lens 104 can be formed of plastic. The first lens 104 can define the front window of the optics of the lens barrel assembly. The first lens 104can have an extended periphery 321 that facilitates handling and mounting thereof. The extended periphery 321 can be planar and need not participate in the focusing process. The extended periphery 321 can be captured in between the front cover 102 and shutter 201.

Centration of the first lens 104 can be provided by the cooperation of the barrel sleeve 100 and the extended periphery 321. That is, the diameter of the first lens 104 at the outermost periphery thereof can be close enough in size to the inner diameter of the barrel sleeve 100 to insure centration to within a desired tolerance. Alternatively, the first lens 104 may be aligned to another component, such as the shutter 201.

A second lens 203 can be formed of plastic. The second lens can be attached to focus actuator 202, so as to effect autofocus as discussed in detail below. Centration of the second lens can be provided by the autofocus actuator 202, which can be formed so as to cooperate with the inner diameter of barrel sleeve 100 to provide centration within a desired tolerance.

The combination of the second lens 203 and the focus actuator can be configured so as to be substantially flat. Such configuration of the second lens 203 and the focus actuator 202 facilitates mounting of the second lens 203 and the focus actuator 202 in the barrel sleeve 100 in a manner similar to the way in which a lens is mounted therein. Thus, at least in some respects, the combination of the second lens 203 and the focus actuator 202 can be treated (handled, stored, mounted, etc.) as thought it is simply a lens. The shape of the focus actuator 202 may be circular, square, hexagonal, octagonal, or any other shape, and the shape of the inside of the barrel sleeve 100 can be complimentary thereto and/or otherwise accommodate the shape of the focus actuator 202.

The barrel sleeve 100 can have conductive conduits formed thereupon so as to facilitate electrical communication with focus actuator 202. For example, either an interior surface of the barrel sleeve 100, an exterior surface thereof, or a combination of interior and exterior surfaces thereof can have metal traces formed thereon so as to effect movement of focus actuator 202 during the autofocusing process. The barrel sleeve 100 can be formed of an insulator, such as plastic.

A third lens 204 can be formed of glass. The use of one glass lens and a plurality of plastic lenses facilitates the application of desirable optical corrections, e.g., such as for chromatic aberration, to the glass lens while minimizing overall costs via the use of the plastic lenses. The glass lens also facilitates the application of infrared-cut filters, which allow visible light to pass while not allowing infrared light to pass. Such filters are most easily applied on glass. Lens 204 can be directly aligned to lens 205. Alternatively, lens 204 can be aligned to the lens barrel sleeve 100. Alternatively, all lenses can be made of plastic to reduce cost, and a separate glass window with the infrared-cut filter added to the stack.

A fourth lens 205 can be formed of plastic. The fourth lens can be the last lens, e.g., the lens that provides light to the imager 206. Thus, the fourth lens can define an imager window, in that it separates the cavity where the imager is located from the rest of the lens barrel. Centration of the fourth lens 205 can be provided by cooperation of the outermost periphery thereof with an inner diameter of barrel sleeve 100, as with the first lens 104. Alternatively, the fourth lens 205can be integrated onto the surface of the imager 206. The fourth lens 206 can be formed, deposited, mounted upon, attached to or otherwise integrated onto to the imager 206.

The clear aperture of the lenses 104, 203, 204, and 205 can increase progressively in diameter from the front of the camera to the back thereof. Thus, the first lens 104 can have the smallest clear aperture and the fourth lens 205 can have the largest clear aperture. The clear aperture of the first and second lenses can be approximately the same size. Alternatively, the second lens 203 can have the smallest clear aperture and therefore be the smallest in size, which can be advantageous since the second lens 203 is being moved for autofocusing. Moving a smaller lens can be accomplished quicker and consumes less power.

Steps 351, 352, and 353 formed by reductions in the inner diameter of barrel sleeve 100 facilitate proper spacing of the optical components, e.g., lenses 104, 203, 204, and 205 and shutter 201. Electrical contacts can be placed at these steps to contact the electrical inputs (or outputs if there is built in sensing) of the actuators.

Shutter 201 can be disposed intermediate first lens 104 and second lens 203. The shutter 201 is basically a capping blade that is actuated to move in and out of the optical path. Shutter 201 can comprise a blade that is configured to move into and out of the light path. The blade and associated support/motion control structures can be form according to MEMS methodology. A MEMS actuator or any other desired type of actuator can be used to move the shutter. An example of a suitable shutter is disclosed in pending U.S. patent application Ser. No. 11/365,790, filed on Feb. 28, 2006 and entitled SHUTTER FOR MINIATURE CAMERA, the entire contents of which are hereby incorporated by reference.

Figure 1:
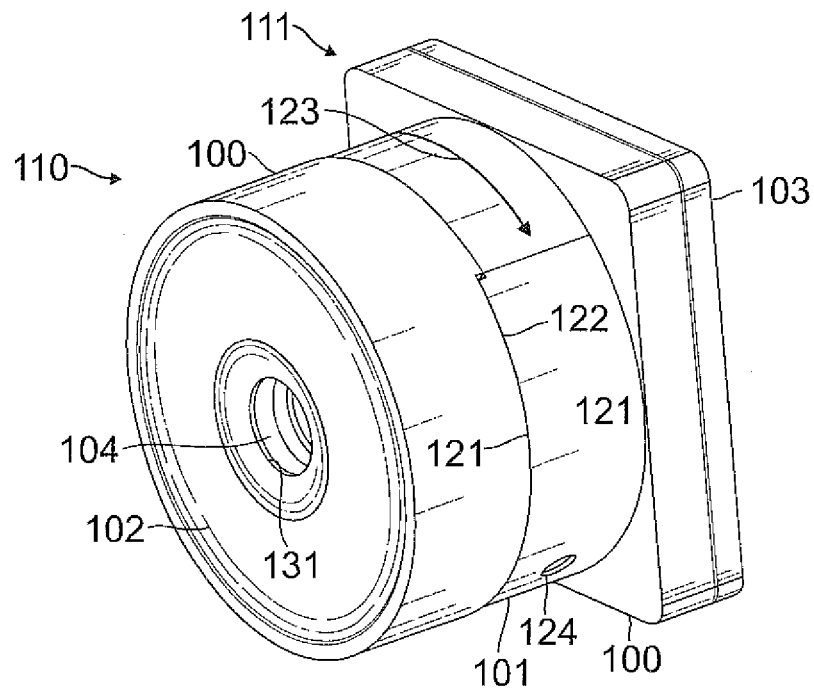
FIG. 1 is a semi-schematic perspective view of a lens barrel assembly, according to an example of an embodiment of the present invention.

Imager 206 can be a CMOS imager or any other desired type of imager or optical sensor. Imager 206 can be held in place by imager PCB 103 (FIG. 1). The imager can be mounted, e.g., glued upon the imager PCB 103 and electrically contacted, such as via wire bonding. The barrel sleeve 100 can be aligned and glued to the imager PCB.

A resolution adjustment of the optics can be performed by rotating focus ring 101 so as to position one or more optical elements, such as a lens or plurality of lenses, a desired distance from imager 206. For example, focus ring 101 can be rotated clockwise, as indicated by arrow 123 of FIG. 1, so as to cause ramp 122 of barrel sleeve 100 to be urged toward the front thereof by complimentary ramp 121 of ring 101 in a manner that deforms barrel sleeve 100 (effectively bending deformable portion 362 of FIG. 3). Such bending of the deformable portion 362 of barrel sleeve 100 may be facilitated by the radially extending configuration of deformable portion 362, which readily accommodates such deformation in a manner that effectively stretches barrel sleeve 100. That is, deformable portion 362 can bend in a manner that lengthens barrel sleeve 100.

Bending deformable portion 362 of barrel sleeve 100 in this manner elongates barrel sleeve 100, thereby moving lenses 104, 203, 204, and 205 farther away from imager 206. Modulation transfer function (MTF) of the image taken by the camera can be used to determine the position of adjustment ring 101, and consequently of the lenses 104, 203, 204, and 205, that provides the best resolution. Once this position of the adjustment ring 101 has been determined, then adjustment ring 101 can be fixed in position, such as by applying adhesive through hole(s) 124.

After such resolution adjustment has been performed, autofocus can be effected by moving a single lens, such as lens 203, via autofocus actuator 202. Thus, such resolution adjustment is typically performed only once, such as during assembly of a camera.

Adjustment ring 101 can be formed as a split ring having two or more portions that attach to one another to facilitate assembly. For example, the two portions of adjustment ring 101 can be snapped, adhesively bonded, ultrasonically welded, thermally welded, or attached to one another via fasteners.

Referring now to FIGS. 5-11, a process for forming a MEMS electrostatic actuator according to an example of an embodiment of the present invention is discussed. This actuator or any other suitable actuator may be used as the autofocus actuator in the example of a barrel assembly described above. This actuator or any other suitable actuator may be used to effect zooming, image stabilization and/or shuttering. Because of its reduced size, the use of the MEMS electrostatic actuator for such functions facilitates the incorporation of such functionality into a lens barrel. Further, an actuator formed according to this process can be used for a variety of other purposes, including purposes that are not related to cameras.

Figure 5:
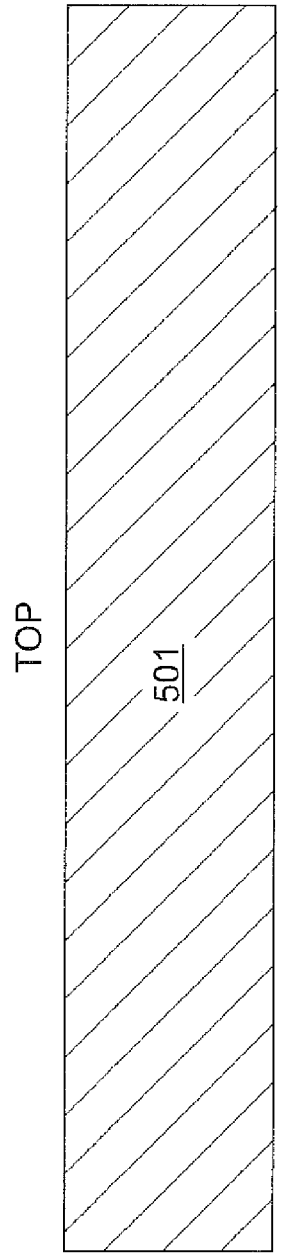
FIG. 5 is a semi-schematic cross-sectional side view of a portion of a standard 8 inch silicon wafer that is to be used to form a MEMS actuator, according to an example of an embodiment of the present invention.
Figure 10:
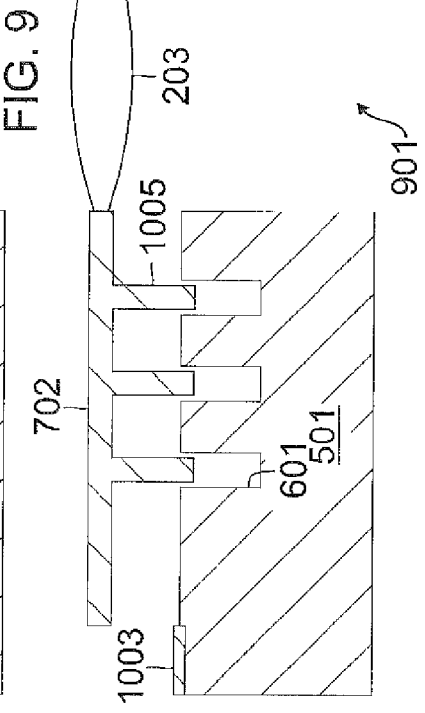
FIG. 10 shows the wafer of FIG. 9 having a lens formed to the polysilicon layer and having the polysilicon layer released from the silicon wafer so as to define an actuator.
Figure 11:
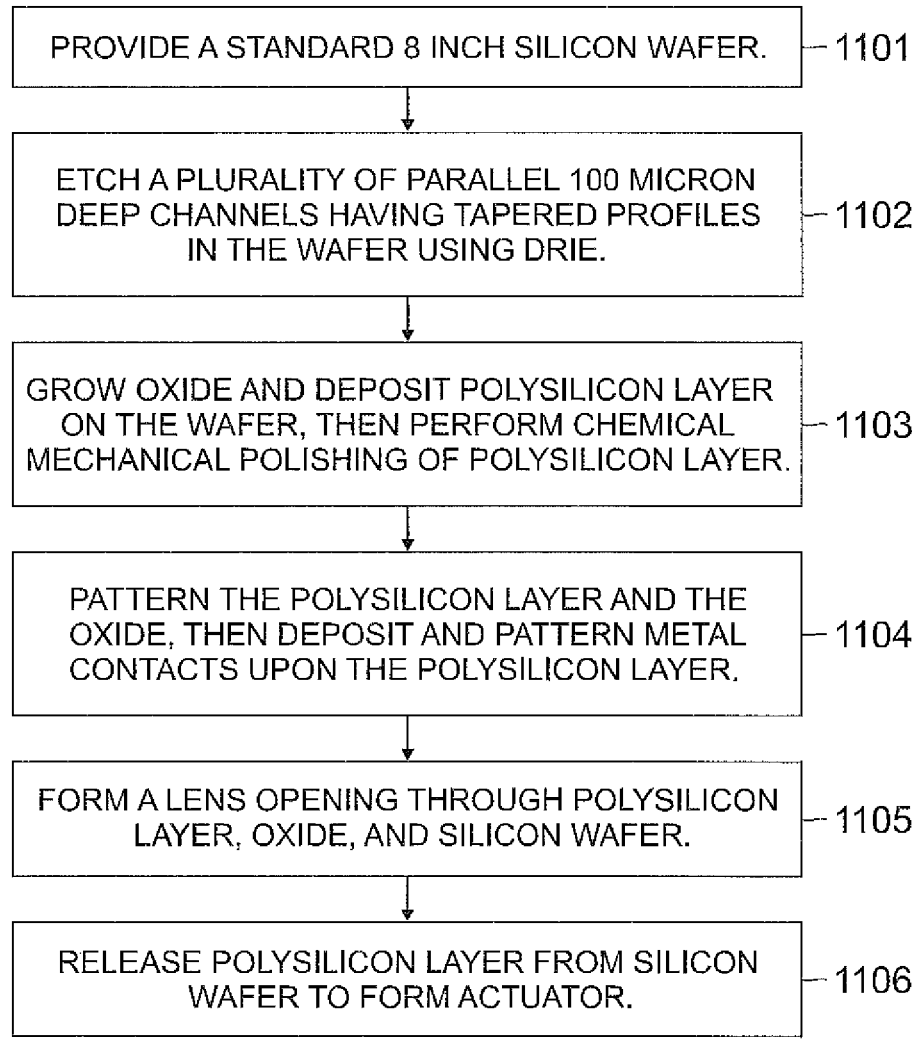
FIG. 11 is a flow chart showing a manufacturing process for making an actuator, such as an autofocus actuator, according to an example of an embodiment of the present invention.

With particular reference to FIG. 5, a standard 8 inch silicon wafer 501 is provided as indicated in block 1101 of FIG. 11. The silicon wafer 501 functions as a substrate for the fabrication of the MEMS electrostatic actuator. It also becomes a part of the actuator, as discussed below. It is worthwhile to appreciate that FIGS. 5-10 show only a portion of the silicon wafer 501 upon which a single autofocus actuator 202 is being formed.

A plurality of such autofocus actuators can be formed upon a single standard 8 inch silicon wafer, as is common in semiconductor manufacturing processes. Each individual autofocus actuator can have any desired footprint shape. According to the illustrated example of an embodiment of the present invention, the footprint is round, so as to conform to the circular cross-section of the barrel sleeve 100 of FIGS. 1-4. According to the second illustrated example of an embodiment of the present invention, the footprint is square as shown in FIGS. 13-15.

Figure 6:
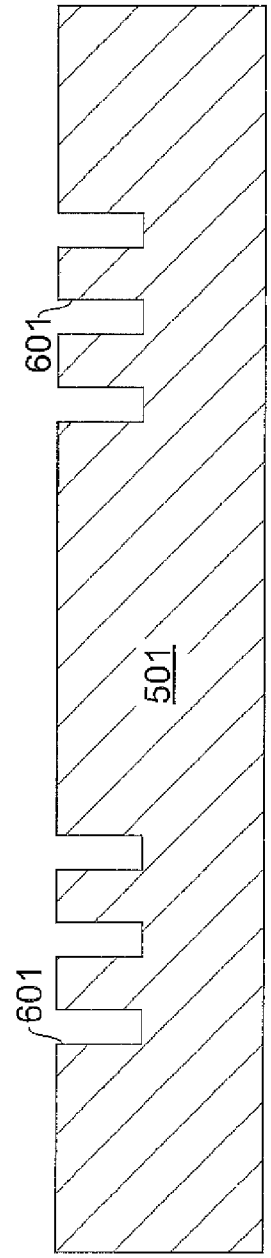
FIG. 6 shows the wafer of FIG. 6 having a plurality of parallel channels formed therein.

With particular reference to FIG. 6, a plurality of generally parallel channels 601 are formed in the silicon wafer 501, as indicated in block 1102 of FIG. 11. These channels form a plurality of parallel lines when view from the top. The channels 601 can alternatively be of any other desired geometric configuration, e.g., concentric circles, concentric squares, non-concentric circles, or non-concentric squares. The channels 601 can be approximately 100 microns deep. The channels 601 can be formed using deep reactive ion etching (DRIE), laser etching, or any other suitable process.

The channels 601 can have a tapered profile, such that they are wider at the top than at the bottom. The use of a tapered profile can more readily facilitate release of the polysilicon layer, as shown in FIG. 10 and discussed in block 1106 of FIG. 11.

Figure 7:
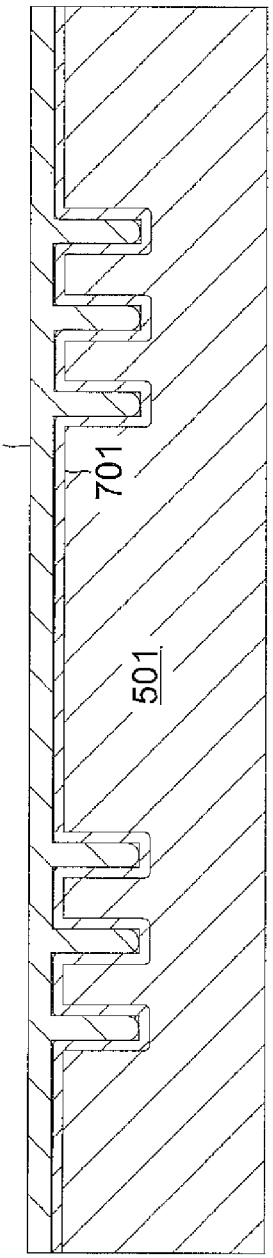
FIG. 7 shows the wafer of FIG. 6 having an oxide and a polysilicon layer formed thereon.

With particular reference to FIG. 7, an oxide layer 701 is grown upon the silicon wafer 501 as indicated in block 1103 of FIG. 11. The oxide layer 701 can extend into the channels 601. Then, a polysilicon layer 702 is deposited atop the oxide layer 701. The polysilicon layer 702 can similarly extend into the channels 601.

The silicon wafer 501 defines one portion, e.g., the stationary portion, of autofocus actuator 202. The stationary portion of the autofocus actuator 202 can be considered to be somewhat analogous to the stator of a rotary motor because it tends to remain stationary. The polysilicon layer 702 defines another portion, e.g., the moving portion, of autofocus actuator 202. The moving portion of the autofocus actuator 202 can be considered to be somewhat analogous to the rotor of a rotary motor because it moves. The oxide layer 701 facilitates release of the polysilicon layer 702 from the silicon wafer 501, as discussed below.

After the polysilicon layer 702 has been deposited upon the oxide layer 701, then the polysilicon layer 702 can be chemically and/or mechanically polished. Such polishing provides a surface that is suitable for further processing, as described below.

Figure 8:
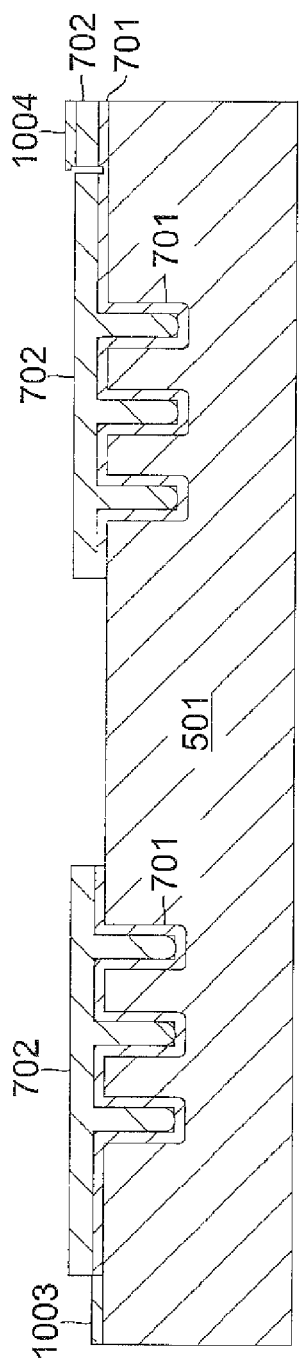
FIG. 8 shows the wafer of FIG. 7 having patterns etched upon the polysilicon layer and showing metal contacts formed thereon.

With particular reference to FIG. 8, the polysilicon layer 702 and the oxide layer 701 can be patterned as indicated in block 1104 of FIG. 11. Metal contacts can be formed upon the polysilicon layer 702 to facilitate operation of the MEMS actuator electrostatically, as discussed below.

Figure 9:
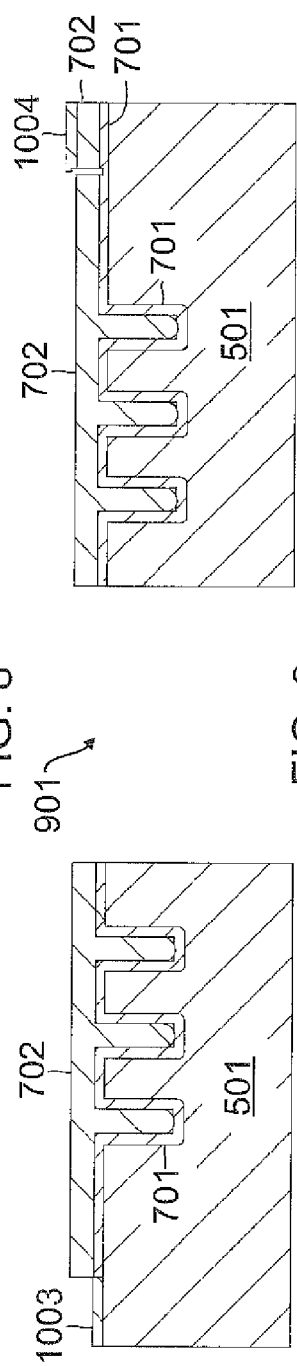
FIG. 9 shows the wafer of FIG. 8 having a lens opening formed therein (although this simplified cross-section appears to show the wafer in two separate portions, the two portions are actually connected and only appear to be disconnected because of the particular cross-section shown and because lines are omitted from this view for clarity)

With particular reference to FIG. 9, a lens opening 901 can be formed through the polysilicon layer 702, the oxide layer 701, and the silicon wafer 501 as indicated in block 1105 of FIG. 11. The lens opening 901 can be generally centrally located, so as to better balance actuator forces in a manner that tends to reduce torque that would cause misalignment of the lens being moved by the autofocus actuator 202. The lens opening 901 can be generally circular, so as to conform to the shape of a lens that is to be attached to polysilicon layer 702, as described below.

It is worthwhile to note that lens opening 901 does not separate wafer 501 into two portions, as the simplified cross-sectional views of FIGS. 9 and 10 may appear to indicate because lines have been removed from these views for clarity. Both of the portions of the wafer 501 can be part of the same piece of polysilicon. Lens opening 901 can be a generally circular opening when viewed from above. Similarly, wafer 501 can be generally circular when viewed from above. Thus, wafer 501 can have the general configuration of a disk with a central circular opening, somewhat like the shape of a CD or DVD. As those skilled in the art will appreciate, other configurations as likewise suitable. For example, the wafer 501 and/or the lens opening 901 can be generally rectangular in configuration.

With particular reference to FIG. 10, the polysilicon layer 702 is released from the silicon wafer 501 as indicated in block 1106 of FIG. 11. More particularly, the oxide layer 701 can be dissolved, such as via acid etching, so as to detach the polysilicon layer 702 from the silicon wafer 501. One or more openings can be formed in the polysilicon layer 702 to facilitate access to the oxide layer 701 by an acid etchant.

Releasing the polysilicon layer 702 from the wafer 501 results in the formation of a plurality of teeth 1005 of the polysilicon layer 702 and also results in the re-formation of the channels 601 (from which the teeth are at least partially removed during the releasing process). The teeth 1005 conform generally to the channels 601 within which the teeth were formed during the process of depositing the polysilicon layer 702.

One or more optical elements can be attached to the released polysilicon layer 702 to facilitate movement of the optical element(s) for any desired purpose. For example, the single lens 203 of FIGS. 2-4 can be attached to released polysilicon layer 702 to facilitate autofocusing as shown in the example of an embodiment of the present invention of FIGS. 1-4. The load experienced by the actuator during movement of such a single lens can be approximately 5 mg.

Electrostatic actuation, according to this example of an embodiment, is an attracting force. Biasing and movement of the polysilicon layer 702 away from the wafer 501 is accomplished non-electrically, such as by mechanically lifting polysilicon layer 702 and securing it in place with epoxy. That is, the polysilicon layer 702 can be mounted away from the wafer 501 such that a spring force is generated by it and/or by structures to which it is attached when the polysilicon layer 702 moves toward the wafer 501. This spring force tends to restore the polysilicon layer 702 to a position away from the wafer 501.

Alternatively, a bimorph can be used by depositing a material on the polysilicon layer 702 that causes the polysilicon layer 702 to bend upwards. Thus, opposite polarity voltages can be applied to polysilicon layer contact 1004 and wafer contact 1003, so as to cause the polysilicon layer 702 to move toward from the wafer 501. The polysilicon layer can be constrained in movement by motion control flexures, such as those described in pending U.S. patent application Ser. No. 11/041,122 filed on Jan. 21, 2005 and entitled MOTION CONTROL. STAGES AND METHODS OF MAKING THE SAME, the entire contents of which are hereby expressly incorporated by reference.

Contact 1003 can be formed by depositing metal upon wafer 501. Contact 1003 can thus facilitate the application of a charge to wafer 501 so as to effect actuation of the actuator.

Contact 1004 can be formed by depositing metal upon polysilicon layer 702, which is formed upon oxide layer 701. Oxide layer 701 electrically insulates contact 1004 from wafer 501. Polysilicon layer 702 beneath contact 1004 can be generally continuous with polysilicon layer 702 which defines the upper portion of the actuator. Such continuity can be provided via a flexure (not shown). The flexure can be defined by a portion of polysilicon layer 702.

That is, a portion of polysilicon layer 702 can flex so as to control the motion of that portion of polysilicon layer 702 that defines the upper portion of the actuator. The flexure can also provide a spring force that biases the upper portion of the actuator defined by polysilicon layer 702 away from wafer 502. The portion of the polysilicon layer 702 that defines a flexure can be integrally formed to the portion of polysilicon layer 702 beneath contact 1004 and can also be integrally formed to the portion of the polysilicon layer 702 that defines the upper portion of the actuator.

Thus, polysilicon layer 702 beneath contact 1004 can be integrally formed to polysilicon layer 702 which defines the upper portion of the actuator by one or more flexures. The polysilicon layer 702 beneath contact 1004, the polysilicon of the flexure(s), and the polysilicon 702 of the upper portion of the actuator can define a single monolithic piece of polysilicon, such that electrical conductivity therebetween is facilitated. Contact 1004 can thus facilitate the application of a charge to layer 702 that defines the upper portion of the actuator so as to effect actuation of the actuator.

Even though polysilicon layer 702 beneath contact 1004 is attached to wafer 501 and polysilicon layer 702 that defines the upper portion of the actuator is separated from wafer 501, thus causing these two portions of the silicon layer 702 to be on different planes (and thus be displaced vertically with respect to one another) as shown in FIG. 10, electrical conductivity between these two portions of the polysilicon layer 702 can be provided by flexures, as described above.

The travel of the released polysilicon layer 702, and consequently of lens 203, can be approximately 80 microns, for example. Such travel facilitates focusing of an image upon imager 206 over a wide range of distances. Contemporary autofocus mechanisms and techniques can be used to determine the position of lens 203 that achieves proper focus.

Contemporary lens barrels move during focusing of a camera. This is done so as to move the lens or lenses disposed therein. The lens barrel of the present invention remains stationary during focusing of the camera. This provides a substantial advantage because clearance does not have to be provided to accommodate movement of the lens barrel during focusing, as must be done according to contemporary practice. Thus, the lens barrel assembly of the present invention facilitates a substantial reduction in the size of a miniature camera. Similarly, zoom and/or image stabilization can be performed without movement of the lens barrel, so as to tend to minimize the size of a miniature camera.

Zoom can be provided using an actuator to move one or more lenses in a manner similar to the manner in which autofocusing is performed, as described herein. In an embodiment, zoom can be provided using an actuator or actuators to move one or more lenses in and out of the optical path, such as according to the method described in pending U.S. patent application Ser. No. 11/263,152, filed on Oct. 31, 2007 and entitled ZOOM LENS ASSEMBLY, the entire contents of which are hereby expressly incorporated by reference. Image stabilization can be provided by moving one or more lenses in a direction perpendicular to the optical axis of the lens system, using one or more actuators, such as MEMS actuators, that can be completely or partially contained within a lens barrel. Alternatively, image stabilization can be provided by moving the imager in a direction perpendicular to the optical axis of the lens system.

The autofocus actuator 202 can have motion control. For example, flexures can be used to limit movement to substantially only that along the optical axis of the camera.

By integrating features such as autofocusing and shuttering with the lens barrel as described above, alignment of the optics, autofocus actuator, and shutter are better facilitated during a stack-up process. The barrel sleeve 100 can function as an alignment fixture for the optics, autofocus actuator, and shutter. In this manner, assembly is simplified and assembly costs are reduced. In addition, the actuators may be electrically contacted at the same time as they are mechanically aligned by introduction into the lens barrel. This can be done by using conductive epoxy or solder to contact the actuator electrical inputs to leads, such as metal traces in the lens barrel at step 352.

By integrating features such as autofocus and shuttering with the lens barrel, the construction of a smaller miniature camera is facilitated. The lens barrel assembly of the present invention can have a length of 5.5 mm or less and can have a diameter of 6.5 mm or less. Such smaller miniature cameras are more readily incorporated into personal electronic devices such as cellular telephones. The ability to construct smaller miniature cameras is particular beneficial because the size of the personal electronic devices within which they are being used is constantly being reduced. Further, smaller miniature cameras are desirable in a variety of other applications including medicine, surveillance, and robotics.

The peak power consumption of the autofocus mechanism of the present invention can be less than approximately 1 mW. The peak power consumption can be approximately 0 mW when the autofocus mechanism is focused at infinity.

As described herein, a semiconductor such as silicon can be integrated with a lens barrel. The semiconductor can be within, such as entirely within, the lens barrel. The semiconductor can define an actuator or any other desired item. The semiconductor can perform a mechanical function, an electrical function, an optical function or any combination of mechanical function, electrical function, and optical function.

For example, the silicon of the actuator of FIGS. 5-10 performs a mechanical function, an electrical function, and an optical function. The actuator performs an electrical function in that it is responsive to electrical signals and its motion is based upon electrostatic attraction. The actuator performs a mechanical function in that it effects movement of a lens. The actuator performs an optical function in that it moves the lens to effect autofocusing. The lens can be mounted to the semiconductor. Alternatively, the lens can be mounted to something other than the semiconductor and can be mechanically linked or otherwise linked to the semiconductor.

The semiconductor can be used to effect alignment of a lens. For example, the silicon of the actuator of FIGS. 5-10 effects alignment of the autofocusing lens.

The semiconductor can be used to effect camera functions other than autofocus. For example, the semiconductor can be used to effect image stabilization, zoom, shuttering and/or irising.

Figure 12:
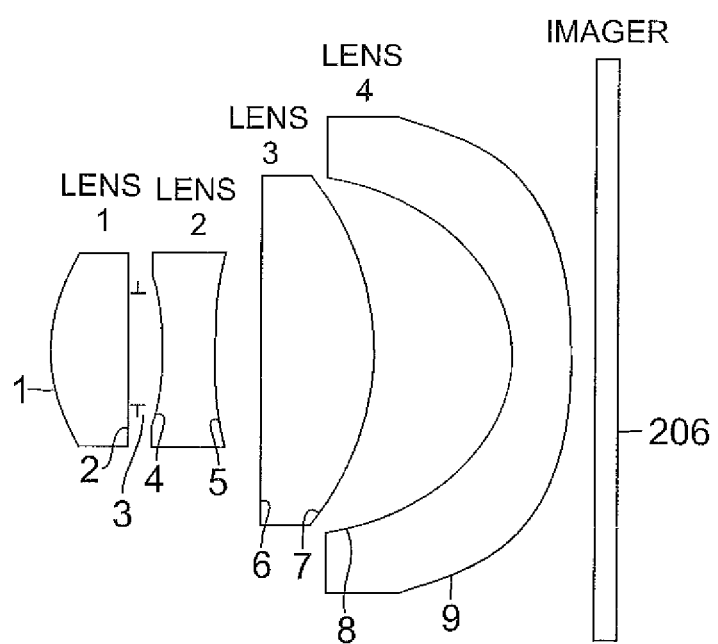
FIG. 12 is a drawing showing an example of a lens configuration according to an example of an embodiment.

Referring now to FIG. 12, an example of a configuration of lenses suitable for one or more embodiments is shown. In FIG. 12, lens 1 can correspond to lens 104 discussed above and/or can correspond to lens 2104 discussed below, lens 2 can correspond to lens 203 discussed above and/or to lens 1203 discussed below, lens 3 can correspond to lens 204 discussed above and/or to lens 1204 discussed below, and lens 4 can correspond to lens 205 discussed above and/or to lens 1205 discussed below. These lenses focus an image upon imager 206 as discussed above and/or upon imager 1206 as discussed below. Details regarding these lenses are provided in the tables below. The lens surfaces referred to in the tables are the lens surfaces labeled 1-9 in FIG. 12.

Lenses 1, 2 and 4 can be either plastic or glass aspheric lenses. Lens 3 can be a plano-convex glass spherical lens. Surface 3 is the aperture stop which can be located just behind the Lens 1.

Lenses 1 and 3 can have positive power. Lenses 2 and 4 can have negative power. Those skilled in the art will appreciate that other configurations may also be used.

Lens 1 and 4 can be formed of the same material so as to meet the condition that: $N_1 = N_4$ and $v_1 = v_4$; and $$0.2 \leq |N_3 - N_1| \leq 0.25;$$

$$0.15 \leq |N_3 - N_2| \leq 0.19;$$

$$0 \leq |N_2 - N_1| \leq 0.1;$$

$$23 \leq |v_1 - v_2| \leq 29;$$

$$20 \leq |v_3 - v_2| \leq 25; \text{ and}$$

$$0 \leq |v_3 - v_1| \leq 10$$

N1, N2, N3 and N4 can be the refractive indices of Lenses 1, 2, 3 and 4 respectively. v1, v2, v3 and v4 can represent the Abbe numbers of Lens 1, 2, 3 and 4 respectively.

An exemplary embodiment can also fulfill the following conditions:

$$2.5 \leq F/\# \leq 4;$$

$$1 \leq \frac{\sum d}{f} \leq 2;$$

$$0.5 \leq \frac{f_1}{f} \leq 1.0;$$

$$-1.5 \leq \frac{f_2}{f} \leq -1.0;$$

$$0.9 \leq \frac{f_3}{f} \leq 1.3; \text{ and}$$

$$-1.0 \leq \frac{f_4}{f} \leq -0.5,$$

where F/# is the f-number of the lens systems.

$\Sigma d = T_1 + d_1 + T_2 + d_2 + T_3 + d_3 + T_4$, where $T_1, T_2, T_3$ and $T_4$ represent the center thickness of Lenses 1, 2, 3 and 4 respectively, d1, d2 and d3 are the center distance between Lenses 1 and 2, Lenses 2 and 3, and Lenses 3 and 4, f represents the effective focal length of the invented lens systems, and f1, f2, f3 and f4 represent the effective focal length of Lens 1, 2, 3 and 4, respectively.

The following is an example of lens system for a "¼" imager when focusing for an object from infinity to 10 cm:

|        | Surface # | Type     | Radius (mm) | Thickness (mm) | Clear Aperture Diameter (mm) | Nd      | Vd    |
|--------|-----------|----------|-------------|----------------|------------------------------|---------|-------|
| Lens 1 | 1         | EVENASPH | 1.489       | 0.637          | 1.514                        | 1.53116 | 56.04 |
|        | 2         | EVENASPH | −11.728     | 0.001          | 1.011                        |         |       |
| STOP   | 3         |          |             | 0.265−0.330    | 0.980                        |         |       |
| Lens 2 | 4         | EVENASPH | −2.988      | 0.421          | 1.184                        | 1.58547 | 29.9  |
|        | 5         | EVENASPH | 9.063       | 0.369−0.304    | 1.570                        |         |       |
| Lens 3 | 6         | STANDARD | Infinity    | 0.902          | 2.061                        | 1.75398 | 52.43 |
|        | 7         | STANDARD | −2.501      | 1.101          | 2.528                        |         |       |
| Lens 4 | 8         | EVENASPH | −1.105      | 0.464          | 2.741                        | 1.53116 | 56.04 |
|        | 9         | EVENASPH | −6.076      | 0.344          | 3.704                        |         |       |
| Imager | 10        | STANDARD | Infinity    | 0.000          | 4.829                        |         |       |

Autofocusing can be performed by moving Lens 2. Any desired combination of autofocusing, zooming, and image stabilization can be achieved by moving one or more lenses according to embodiments of the present invention.

According to an exemplary embodiment of the present invention, the following conditions for the lens materials can be met:

According to this example, Lens 1, 2 & 4 are aspheric lenses.

An even aspheric surface is defined as:

$$z = (y^2/r)/[1 + \{1-(K+1)(y/r)^2\}^{1/2}] + A_4 y^4 + A_6 y^6 + A_8 y^8 + A_{10} y^{10} + A_{12} y^{12} + A_{14} y^{14} + A_{16} y^{16}$$

where z represents the coordinate in the direction of the optical axis, r is the curvature radius of the surface, y represents the radial distance from the optical axis, K represents a conic coefficient, and A4, A6, A8, A10, A12, A14 and A16 represent spherical coefficients.

The two even aspheric surfaces for each lens can be defined as follows:

| Lens 1 | |
| --- | --- |
| | Nominal Value |
| Surface 1 | |
| r (mm) | 1.489 |
| k | −1.763904505 |
| A4 | −3.37831453E−02 |
| A6 | 6.31237827E−01 |
| A8 | −1.83751892E+00 |
| A10 | 1.90876042E+00 |
| A12 | 2.81949971E−01 |
| A14 | −3.84152817E−01 |
| A16 | −1.28511281E+00 |
| Surface 2 | |
| r (mm) | −11.728 |
| k | 121.8050594 |
| A4 | 2.58544814E−01 |
| A6 | −2.85268219E+00 |
| A8 | 1.29641230E+01 |
| A10 | −1.63510196E+01 |
| A12 | −3.61644697E+01 |
| A14 | 2.50038498E+01 |
| A16 | 1.62889106E+02 |

| Lens 2 | |
| --- | --- |
| | Nominal Value |
| Surface 4 | |
| r (mm) | −2.988 |
| k | 1.505991937 |
| A4 | −2.44121601E−01 |
| A6 | 3.27242019E+00 |
| A8 | −1.76603347E+01 |
| A10 | 3.64178707E+01 |
| A12 | −3.56017751E+00 |
| A14 | −3.56769930E+01 |
| A16 | −4.41699943E+01 |
| Surface 5 | |
| r (mm) | 9.063 |
| k | 15.87915849 |
| A4 | 1.91897142E−01 |
| A6 | −7.07583763E−01 |
| A8 | 2.63858921E+00 |
| A10 | −4.33811812E+00 |
| A12 | −1.77440779E−01 |
| A14 | 8.83070686E+00 |
| A16 | −7.38552098E+00 |

| Lens 4 | |
| --- | --- |
| | Nominal Value |
| Surface 8 | |
| r (mm) | −1.105 |
| K | −0.734444588 |
| A4 | −7.12988579E−02 |
| A6 | 2.29325914E−01 |
| A8 | −2.96858715E−01 |
| A10 | 1.64062768E−01 |
| A12 | −1.34697109E−04 |

| Lens 4 (continued) | |
| --- | --- |
| | Nominal Value |
| A14 | −3.56892021E−02 |
| A16 | 9.12926777E−03 |
| Surface 9 | |
| r (mm) | −6.076 |
| K | 4.038548503 |
| A4 | −6.40721227E−02 |
| A6 | 2.20241118E−02 |
| A8 | −1.33762116E−02 |
| A10 | 5.28633445E−03 |
| A12 | −2.29752300E−04 |
| A14 | −4.35522610E−04 |
| A16 | 7.21213450E−05 |

The shutter 201 and the focus actuator can be MEMS devices, non-MEMS devices, or any desired combination of MEMS devices and non-MEMS devices. For example, the shutter 201 can be a MEMS device formed at least partially from a monolithic piece of silicon.

FIGS. 13-15 show an example of an embodiment of the present invention, wherein the lens barrel is defined by separate sleeve and component portions. The sleeve portion and the component portion are attached to one another. The lens barrel has a sleeve portion that is somewhat like the entire lens barrel of the example of an embodiment of FIGS. 1-4. The sleeve portion of FIGS. 13-15 contains optical elements and maintains the alignment of the optical elements. Unlike the lens barrel of FIGS. 1-4, the sleeve portion of FIGS. 13-15 does not contain all of the optical elements of the camera.

Further, unlike the lens barrel of the example of an embodiment of FIGS. 1-4, the lens barrel of the example of an embodiment of FIGS. 13-15 also comprises a separate component portion that is generally contiguous with the sleeve portion. The component portion increases the length of the lens barrel. The component portion can be defined by one or more components such as optical elements or actuators that are, in effect, added on to the sleeve portion. These components and/or housings or holders thereof effectively extend the length of the lens barrel by adding to the length of the sleeve portion thereof.

Thus, instead of having the sleeve enclose all of the components of the lens barrel, as in the example of an embodiment of FIGS. 1-4, some of these components are outside of the sleeve and are configured so as to be part of the lens barrel. Such configuration includes structures that facilitate alignment of optical components and structures that provide light control.

The structures that facilitate alignment of optical components and the structures that provide light control can be the same structures. For example, the structures that facilitate alignment of optical components and the structures that provide light control can be the housings or holders of actuators and/or optical elements. These housings or holders can be opaque and can fit together in a manner that provides light control (that does not permit substantial light leakage into the optical path). These housings or holders can also fit together with sufficient tolerances so as to provide adequate alignment of any optical components that they contain.

By way of contrast, the lens barrel sleeve 100 of the example of an embodiment of FIGS. 1-4 is defined only by a sleeve (the lens barrel and the sleeve are the same structure in the example of an embodiment of FIGS. 1-4). The lens barrel or sleeve contains the optical elements or components such as lenses 104, 203, 204 and 205, as well as shutter 201 and autofocus actuator 202. None of these components are disposed outside of the lens barrel sleeve 100 and therefore they are not configured so as to effectively extend the length of lens barrel sleeve 100.

Any desired number of sleeve and component portions of the lens barrel can be used. Thus, the lens barrel can comprise one sleeve portion and one component portion, one sleeve portion and two component portions, two sleeve portions and one component portion, or two sleeve portions and two component portions, for example.

Any desired configuration or positioning of the sleeve portion(s) and component portion(s) can be used. Thus, a sleeve portion can be closest to the imaging sensor or a component portion can be closest to the imaging sensor. The sleeve portion can be between two component portions. The component portion can be between two sleeve portions.

Referring now to FIGS. 13-15, a sleeve portion 1000 can cooperate with a component portion 2000 to define a lens barrel. This lens barrel can be considered to be generally functionally equivalent to lens barrel sleeve 100 of FIGS. 1-4 and can thus can function as a housing to facilitate handling and alignment of the components contained therein, to seal out moisture and other contaminants, and/or to prevent stray light from reaching the imager. All or any desired portion of the lens barrel, e.g., the sleeve portion 1000 and/or the component portion 2000, can be formed of a metal, a polymer with metal fill, or a polymer that is coated with a metal to provide electromagnetic interference shielding. A focus ring 2101 can facilitate an initial resolution adjustment of the optics of the lens barrel assembly that can be performed at the factory, as discussed above.

With the exception that some of the components of the example of an embodiment of FIGS. 13-14 define a portion of the lens barrel, many of the components of the embodiment of FIGS. 13-14 are similar to those of FIGS. 1-4 and perform similar functions. Thus, like the example of an embodiment of FIGS. 1-4, the example of an embodiment of FIGS. 13-14 can comprise a first lens 2104, a second lens 1203, a third lens 1204, and a fourth lens 1205. Like the example of an embodiment of FIGS. 1-4, the lenses of the example of an embodiment of FIGS. 13-15 can conform to the examples of parameters provided in the tables herein. One lens, e.g., the third lens 1204, can be formed of glass and the other lens, e.g., first lens 2104, second lens 1203, and fourth lens 1205, can be formed of plastic. The lenses 2104, 1203, 1204, and 1205 can increase progressively in clear aperture diameter from the front of the camera to the back thereof. The first lens 2104 can have the smallest clear aperture diameter of the lenses 2104, 1203, 1204, and 1205.

The combination of the second lens 1203 and the focus actuator 1202 can be configured so as to be substantially flat to facilitate handling, stacking, and mounting thereof. As opposed to the example of an embodiment shown in FIG. 1-4, the focus actuator 1202 is configured to be generally square when viewed from the front. The focus actuator 1202, as well as the other components, can have any desired shape, such as when viewed from the front.

Indeed, the sleeve portion 1000 and the component portion 2000 can have any desired cross-sectional shape or configuration. For example, the sleeve portion 1000 can be generally round in cross-section (as shown in FIGS. 14 and 15) and the component portion 2000 can be generally rectangular, e.g., square, in cross-section (as shown in FIGS. 14 and 15).

A shutter and/or an iris can optionally be included in the integrated lens barrel. For example, aperture 2102 can comprise a shutter and/or an iris. Similarly, a zoom actuator and/or image stabilization can optionally be included in the integrated lens barrel. For example, lens holder 1211 (FIGS. 13 and 14) can comprise a zoom actuator and/or image stabilization.

As in the example of an embodiment of FIGS. 1-4, imager 1206 can be a CMOS imager or any other desired type of imager or optical sensor and can be held in place by imager printed circuit board 2103.

Resolution adjustment of the optics can be performed by rotating focus ring 2101 so as to position one or more optical elements, such as a lens or plurality of lenses, a desired distance from imager 1206. Adjustment ring 2101 can be formed as a split ring having two or more portions that attach to one another to facilitate assembly. Rotating focus ring 2101 can effect movement of one or more lenses, as describe above.

With particular reference to FIG. 15, aperture 2102 admits light to the integrated lens barrel. First lens 2104 can be followed by a baffle 1151 that tends to mitigate stray light from traveling further through the integrated lens barrel, so as to enhance contrast and improve image quality.

The second lens 1203 can be supported and moved by the autofocus actuator 1202 so as to facilitate autofocusing. The autofocus actuator 1202 comprises a front housing 1152, a back housing 1154, and a MEMS actuator with motion control 1153. The MEMS actuator with motion control 1153 can comprise a MEMS actuator as described herein with respect to FIGS. 5-11. The motion control can comprise motion control flexures, such as those described in pending U.S. patent application Ser. No. 11/041,122 filed on Jan. 21, 2005 and entitled MOTION CONTROL STAGES AND METHODS OF MAKING THE SAME, the entire contents of which are hereby expressly incorporated by reference.

A third lens 1204 receives light from the second lens 1203 and a fourth lens 1205 receives light from the third lens 1204. The third lens 1203 can be attached directly to and can support the fourth lens 1204.

The distance between the fourth lens 1205 (as well as the third lens 1204) and the imager 1206 can be varied by rotating the focus ring 2101, as is done with the embodiment shown in FIGS. 1-4. The distance between the second lens 1203 and the imager 1206 can be varied by focus actuator 1202.

An autofocus driver 1157 can contain the electronic circuitry necessary to drive the MEMS actuator with motion control 1153. Electrical communication between the autofocus driver 1157 and the MEMS actuator with motion control 1153 can be facilitated by flexible electronic conductors or flex circuit 1156.

As can be seen from FIGS. 13-15, the autofocus actuator 1202, as well as other components, can form a part of the lens barrel. In this instance, the lens barrel is at least partially defined by sleeve portion 1000, housing 1152 and 1154, and the autofocus actuator 1202. Moreover, the lens barrel can comprise anything that performs at least one of the lens barrel functions of optical component alignment and light control. The first lens holder 1211 and the autofocus actuator 1202 perform both of these lens barrel functions.

Referring now to FIGS. 16-19, the optical characteristics of an exemplary embodiment of the present invention are shown. These charts are the result of optically modeling the lens system and then running simulations thereon. Those skilled in the art will appreciate that other lens systems having other optical characteristics can be similarly suitable for use in the present invention.

Figure 16:
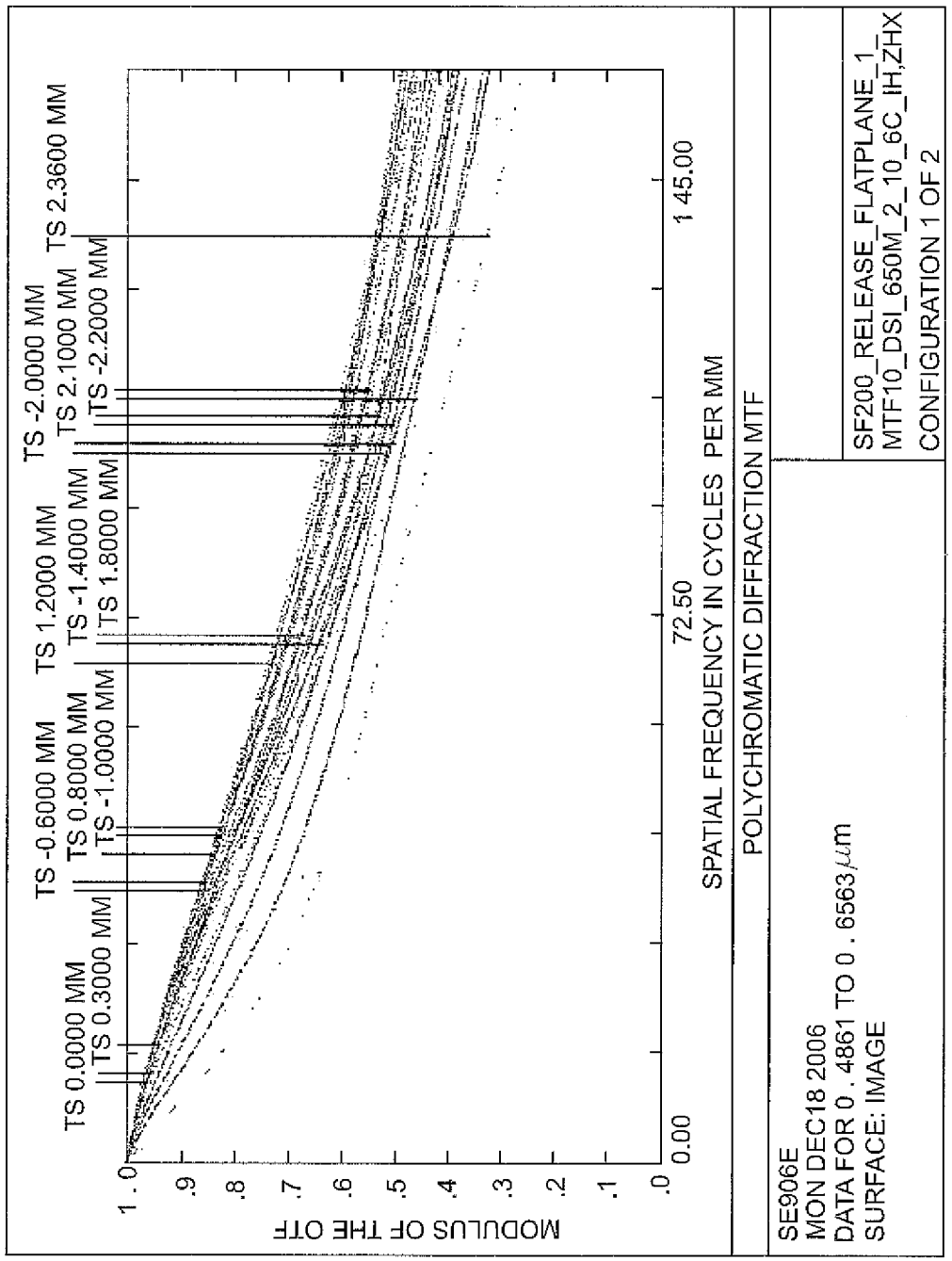
FIG. 16 is a chart showing the polychromatic diffraction modulation transfer function (MTF) of an exemplary embodiment of the present invention, for an object at infinity.

With particular reference to FIG. 16, the polychromatic diffraction modulation transfer function (MTF) of an exemplary embodiment of the present invention for an objection at infinity is shown. As can been seen, the MTF at a spatial frequency of 100 cycles per millimeter is from approximately 0.45 to approximately 0.65.

Figure 17:
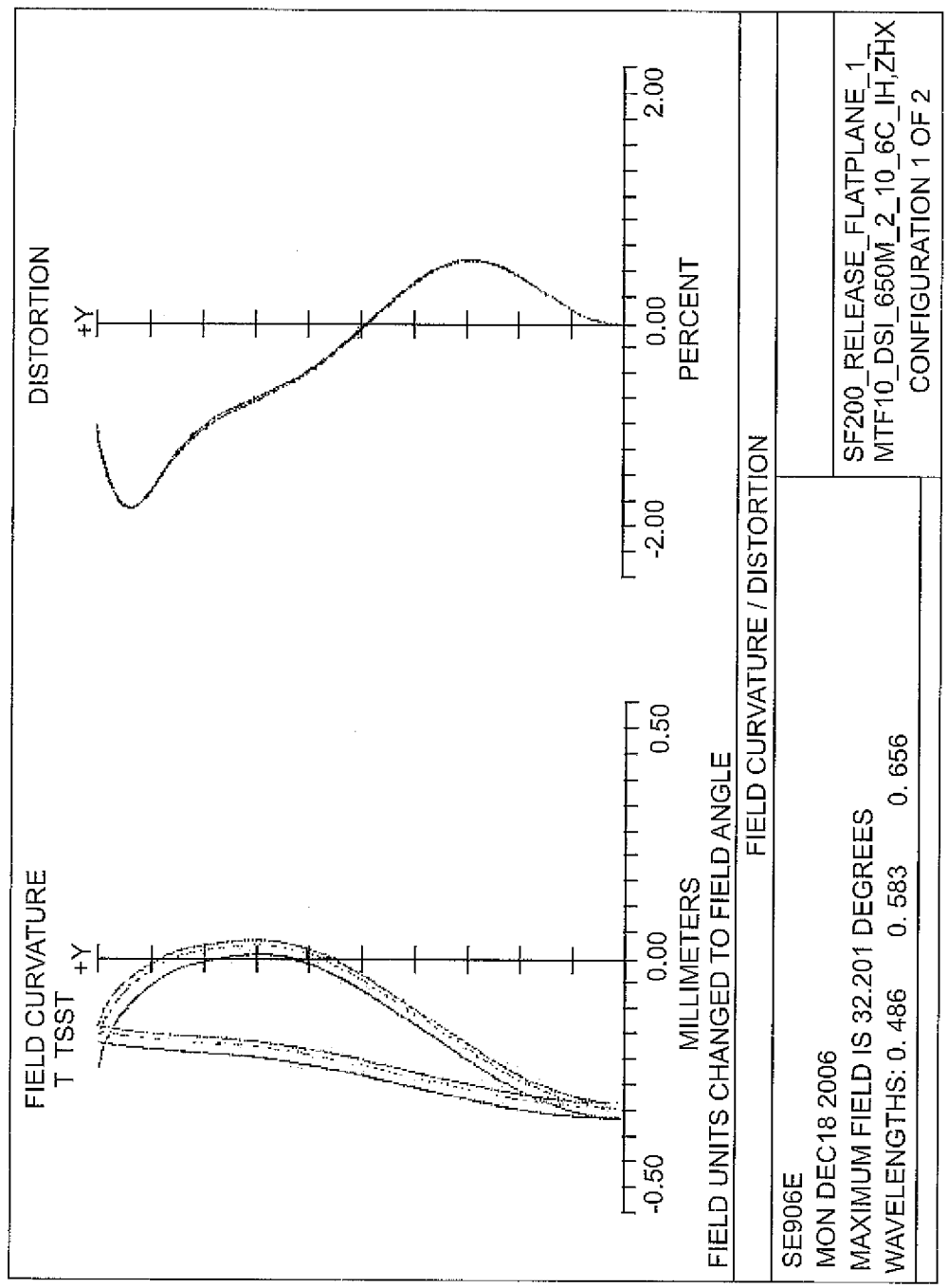
FIG. 17 is a chart showing the field curvature/distortion of an exemplary embodiment of the present invention for an object at infinity.

With particular reference to FIG. 17, the field curvature and distortion for the exemplary embodiment of the present for an object at infinity are shown. The maximum distortion is well within +/−2%.

Figure 18:
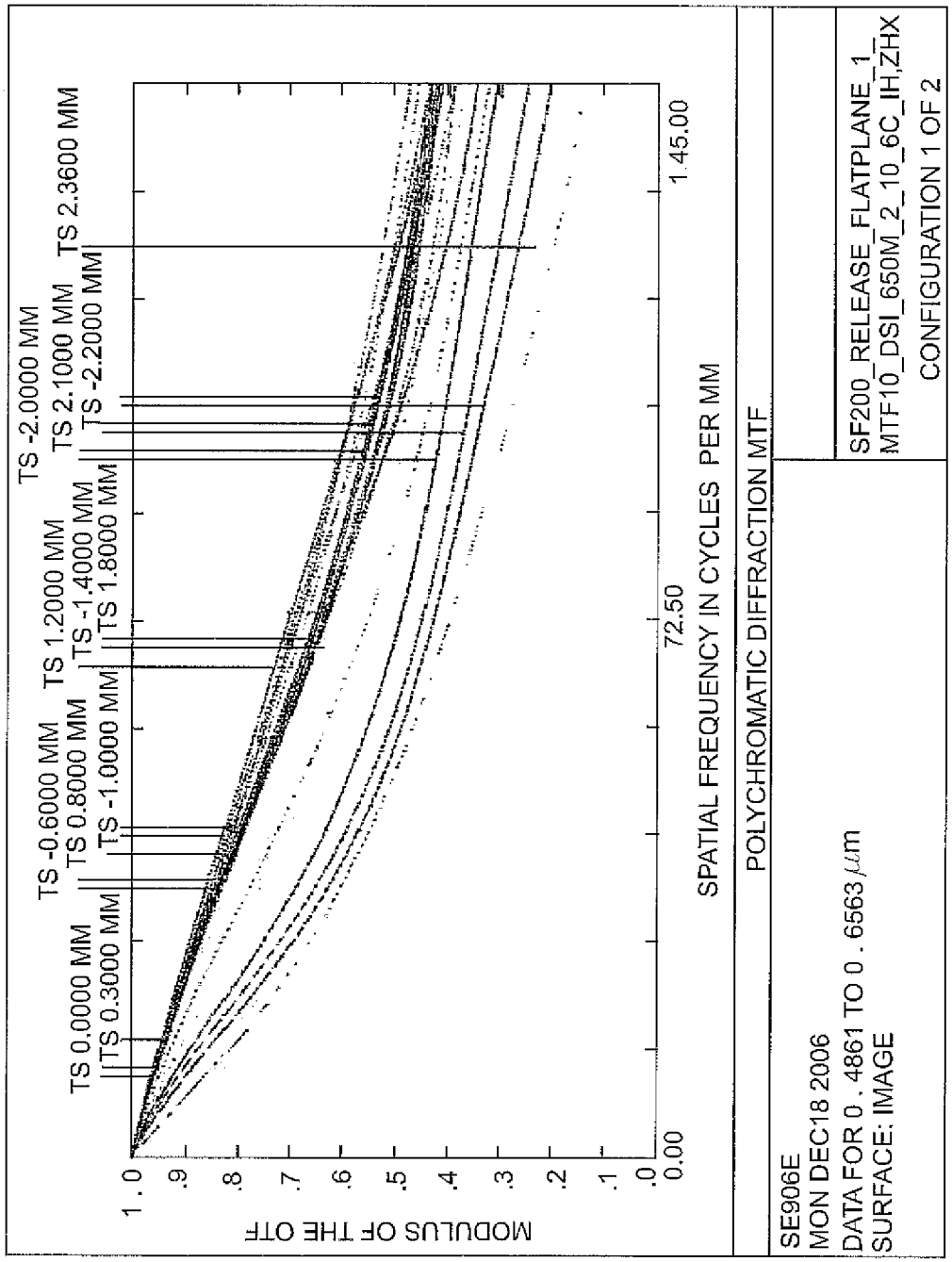
FIG. 18 is a chart showing the polychromatic diffraction modulation transfer function (MTF) of an exemplary embodiment of the present invention for an object at 10 centimeters.

With particular reference to FIG. 18, the polychromatic diffraction modulation transfer function (MTF) of the exemplary embodiment of the present invention for an object at 10 centimeters is shown. As can been seen, the MTF at a spatial frequency of 100 cycles per millimeter is from approximately 0.3 to approximately 0.6.

Figure 19:
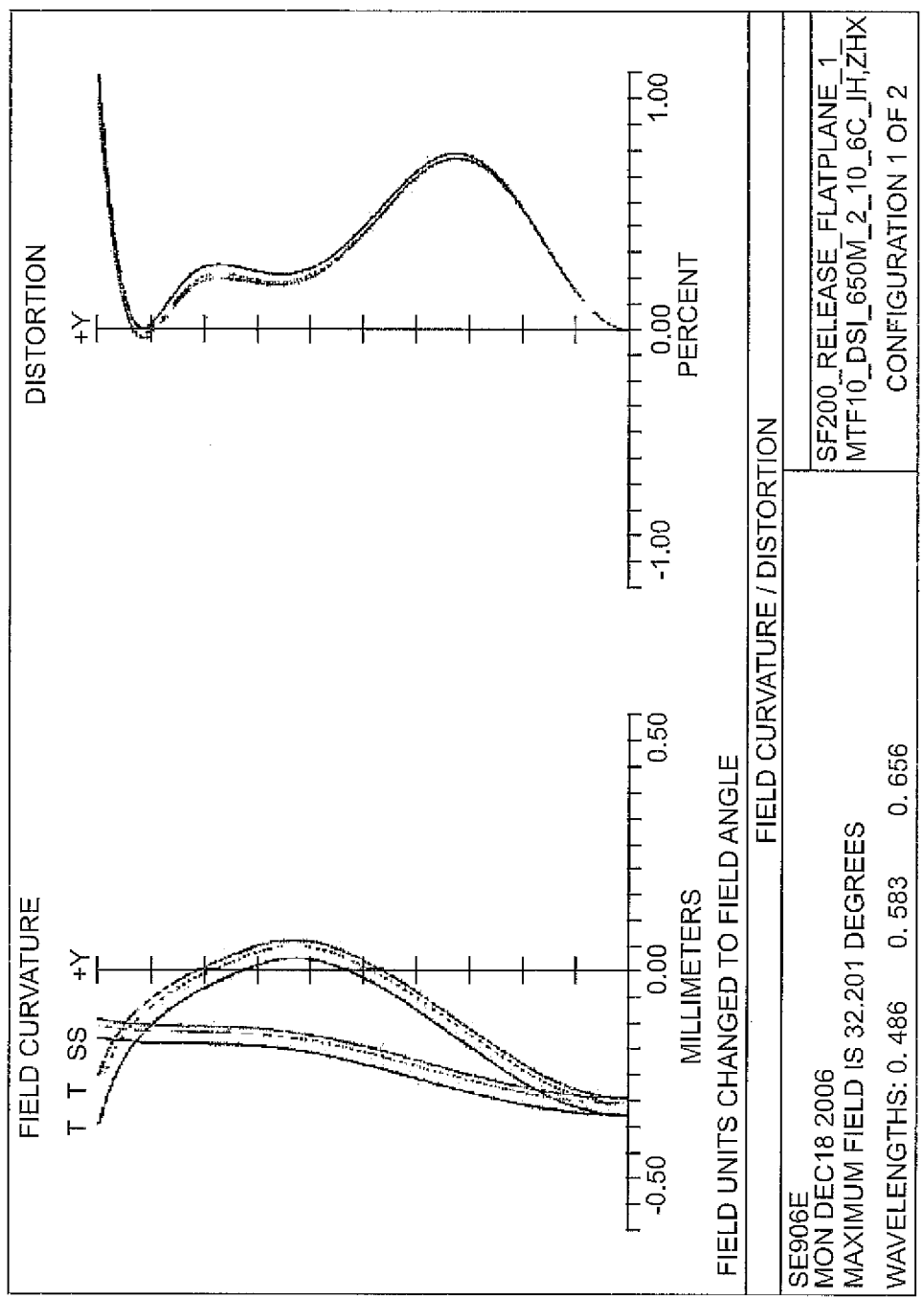
FIG. 19 is a chart showing the field curvature/distortion of an exemplary embodiment of the present invention for an object at 10 centimeters.

With particular reference to FIG. 19, the field curvature and distortion for the exemplary embodiment of the present for an object at 10 centimeters are shown. The maximum distortion is well within +/−1%.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. An integrated lens barrel comprising:
    a barrel having an inner diameter; and
    a planar autofocus mechanism mechanically disposed within the barrel inside the inner diameter, wherein the planar autofocus mechanism comprises an autofocus lens through which an optical path extends and an autofocus actuator surrounding and supporting the autofocus lens, the autofocus actuator configured to move the autofocus lens along the optical path; wherein the autofocus mechanism including the autofocus lens and the autofocus actuator are part of a stack of optical components through which the optical path extends.

2. The integrated lens barrel as recited in claim 1, further comprising a zoom mechanism disposed within the barrel, wherein the zoom mechanism comprises a zoom lens through which the optical path extends and a zoom actuator surrounding and supporting the zoom lens, the zoom actuator configured to move the zoom lens along the optical path, and wherein the zoom mechanism including the zoom lens and the zoom actuator are part of the stack of optical components.

3. The integrated lens barrel as recited in claim 1, further comprising an image stabilization mechanism disposed within the barrel, wherein the image stabilization mechanism comprises an image stabilization lens through which the optical path extends and an image stabilization actuator surrounding and supporting the image stabilization lens, the image stabilization actuator configured to move the image stabilization lens, and wherein the image stabilization mechanism including the image stabilization lens and the image stabilization actuator are part of the stack of optical components.

4. The integrated lens barrel as recited in claim 1, wherein the barrel is configured for use with a miniature camera and wherein the planar autofocus mechanism is disposed in a plane perpendicular to the optical path.

5. The integrated lens barrel as recited in claim 1, further comprising a fourth lens that defines an imager window and wherein the planar autofocus mechanism is disposed between two optical components along the optical path.

6. The integrated lens barrel as recited in claim 1, further comprising a fourth lens that is deposited on the imager.

7. The integrated lens barrel as recited in claim 1, further comprising a first lens that defines a front window.

8. The integrated lens barrel as recited in claim 1, wherein the barrel is stationary with respect to an imager during autofocusing, wherein the inner diameter of the barrel is circular, and wherein the planar autofocus mechanism comprises a disk-shaped body within which the autofocus lens and the autofocus actuator are disposed, and wherein the disk-shaped body of the autofocus mechanism is disposed and within the stack of optical components with a circular plane of the disk-shaped body arranged perpendicular to the optical path.

9. The integrated lens barrel as recited in claim 1, wherein the barrel is stationary with respect to the imager during an auto-focusing operation.

10. The integrated lens barrel as recited in claim 1, wherein the autofocus mechanism comprises a MEMS electrostatic actuator.

11. The integrated lens barrel as recited in claim 1, wherein the autofocus mechanism comprises a MEMS electrostatic actuator having MEMS motion control.

12. The integrated lens barrel as recited in claim 1, wherein the barrel functions as a housing.

13. The integrated lens barrel as recited in claim 1, wherein the barrel comprises a conductor and functions as an EMI shield.

14. An integrated lens barrel for a miniature camera, the integrated lens barrel comprising:
    a component portion including an autofocus mechanism with a central aperture receiving a first lens and an actuator surrounding and supporting the first lens; and
    a sleeve portion coupled to the component portion, wherein the sleeve portion comprises an image stabilization mechanism disposed within the lens barrel.

15. The integrated lens barrel of claim 14, wherein the autofocus mechanism comprises a MEMS electrostatic actuator.

16. The integrated lens barrel of claim 14, wherein the sleeve portion includes a second lens and a focus ring for adjusting a distance between the second lens and the first lens, wherein the autofocus mechanism is disposed and aligned within a stack of optical components.

17. An integrated lens barrel, comprising:
    a barrel having an inner diameter defining a plurality of steps;
    a first lens received by a first one of the steps; and
    a focus mechanism received by a second one of the steps, wherein the focus mechanism has a central aperture receiving a second lens and an actuator surrounding and supporting the second lens, the actuator configured to move the second lens.

18. The integrated lens barrel of claim 17, wherein the focus mechanism comprises a disk-shaped body within which the second lens and the actuator are disposed, and wherein the disk-shaped body of the focus mechanism is disposed and aligned within a stack of optical components within the lens barrel.

19. The integrated lens barrel of claim 18, wherein the actuator of the focus mechanism comprises a MEMS actuator.

20. The integrated lens barrel as recited in claim 1, further comprising a shutter disposed within the barrel and is a part of the stack of the optical components.

* * * * *

UNITED STATES PATENT AND TRADEMARK OFFICE
CERTIFICATE OF CORRECTION

Page 1 of 1

| | |
|---|---|
| PATENT NO. | : 9,146,445 B2 |
| APPLICATION NO. | : 13/216225 |
| DATED | : September 29, 2015 |
| INVENTOR(S) | : Roman C. Gutierrez and Robert J. Calvet |

It is certified that error appears in the above-identified patent and that said Letters Patent is hereby corrected as shown below:

Claims

In column 18, line 9, claim 8:

Remove the word "and"

Column 18, line 9, claim 8 should read:

--"body of the autofocus mechanism is disposed within the"--

Signed and Sealed this
Fifth Day of April, 2016

Michelle K. Lee
*Director of the United States Patent and Trademark Office*